United States Patent [19]
Bent et al.

[11] Patent Number: 4,916,455
[45] Date of Patent: * Apr. 10, 1990

[54] LOCATING SYSTEM AND METHOD

[75] Inventors: Rodney B. Bent, Indialantic; Paul W. Casper, West Melbourne, both of Fla.

[73] Assignee: Scientific Development Inc., Palm Bay, Fla.

[ * ] Notice: The portion of the term of this patent subsequent to Mar. 14, 2006 has been disclaimed.

[21] Appl. No.: 294,736

[22] Filed: Jan. 6, 1989

Related U.S. Application Data

[62] Division of Ser. No. 16,788, Feb. 20, 1987, Pat. No. 4,812,852.

[51] Int. Cl.⁴ ............................ G01S 3/02; G01S 1/24
[52] U.S. Cl. ..................................... 342/457; 342/387; 364/460
[58] Field of Search ....................... 342/457, 465, 387; 364/460

[56] References Cited

U.S. PATENT DOCUMENTS 3,680,121  7/1972  Anderson et al. ................... 342/457
4,318,105  3/1982  Brodeur ............................... 342/389
4,423,419  12/1983  Johannessen ........................ 342/387

Primary Examiner—Thomas H. Tarcza
Assistant Examiner—Gregory C. Issing

[57] ABSTRACT

The present invention includes both a system and a method for locating a source of a randomly modulated signals. In one form of the invention at least three receiving stations receive and process the randomly modulated signal. A common reference level is selected at each of the receiving stations. The times of arrival at each receiving station of the selected transitions of the signal with reference to the common reference level are determined. Each of the receiving stations provides an indication of the selected transitions to a center facility for processing to provide an indication of the location of the signal.

23 Claims, 6 Drawing Sheets

VOICE WAVEFORM TIME DELAY MEASUREMENT

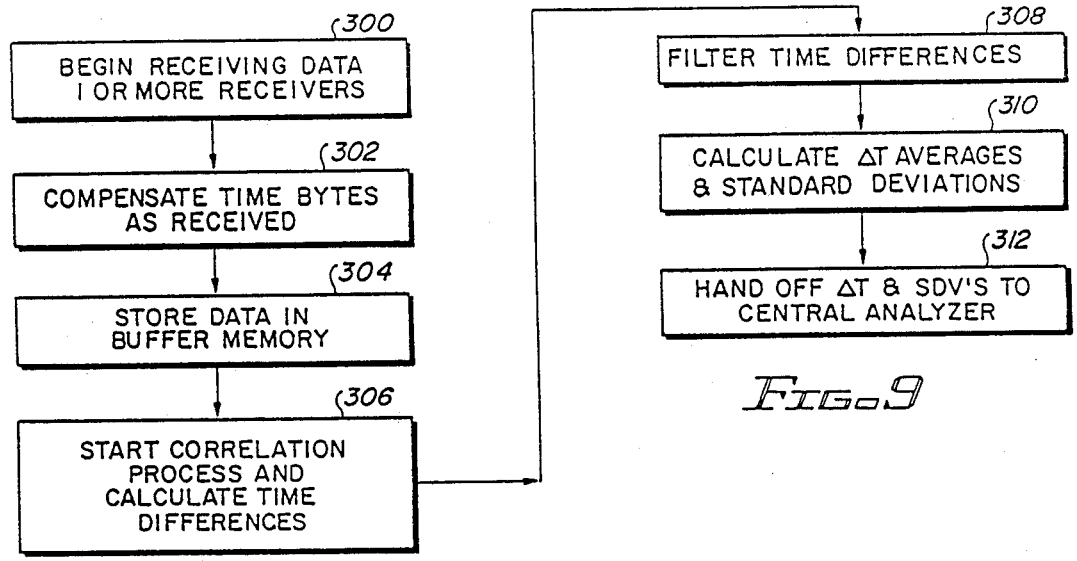
FIG. 9
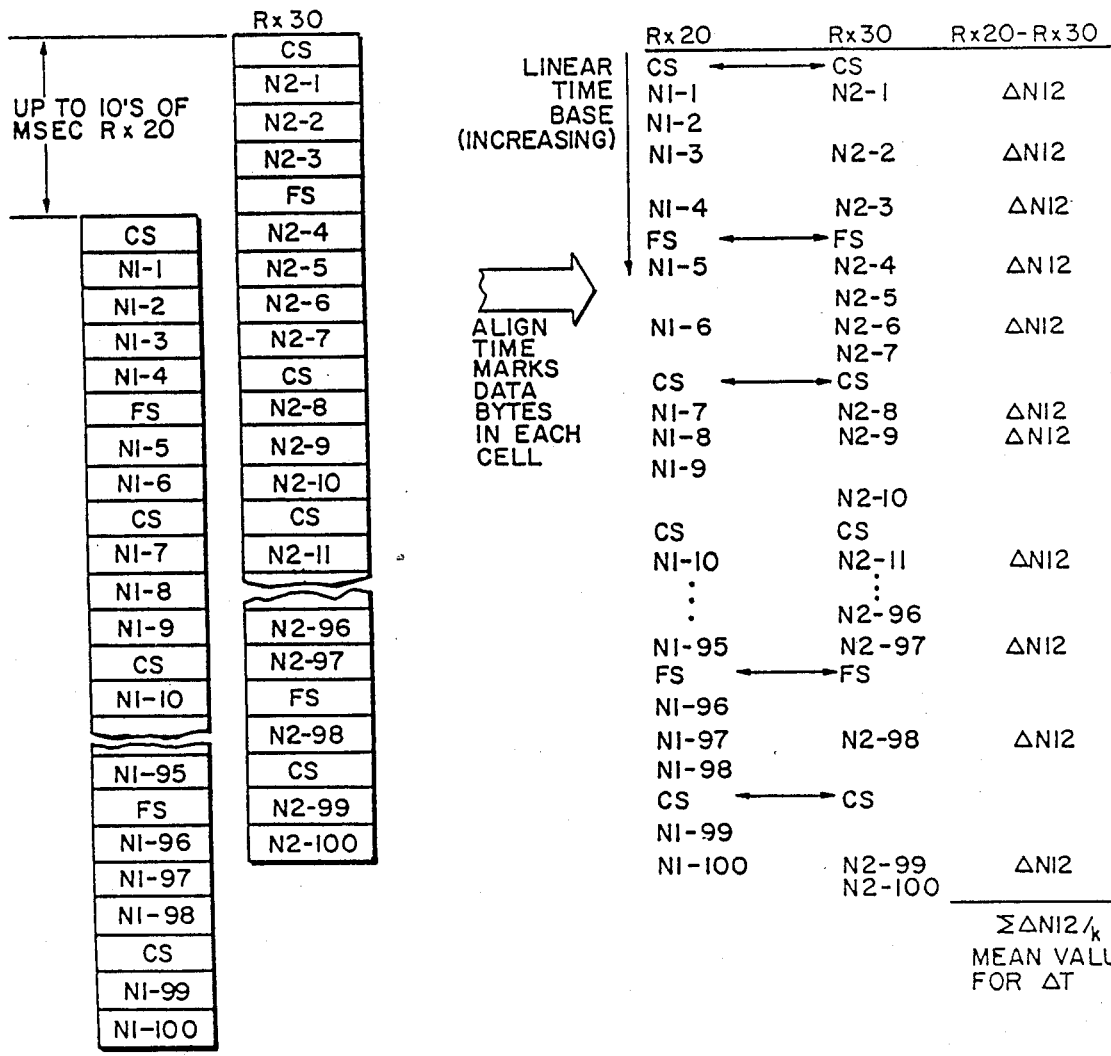
FIG. 10A
FIG. 10B

LOCATING SYSTEM AND METHOD

This is a division of application Ser. No. 07/016,788 filed Feb. 20, 1987, now Pat. No. 4,812,852.

FIELD OF THE INVENTION

The present invention relates in general to systems and methods for determining the location of a stationary or mobile transmitting unit.

BACKGROUND OF THE INVENTION

This invention relates to a system and method for determining the location of a stationary or mobile transmitting unit such as, for example, mobile police units and emergency vehicles. For example, it is desirable to ascertain the location of police and emergency vehicles in order to be able to provide help both rapidly and effectively. It is also desirable to be able to locate vehicles carrying valuable documents or cargo on a time scheduled route in order to ascertain their actual position in reference to their scheduled position.

Furthermore, it is desirable for a main communication site, such as a taxi or delivery vehicle dispatcher, to be able to monitor the movement or location of each of a plurality of mobile units. Still further, it may be desirable to locate persons, such as policemen and watchmen, not associated with vehicles.

Typically, such units, both persons and vehicles, are equipped with radios that communicate with a primary location, such as a dispatcher. In order for the dispatcher to know the location of a unit, it is generally necessary for the unit to broadcast the location. However, there are systems which transmit a unique tone over a transmitter to receivers stationed in a local area for determining the transmitter's location.

Prior art systems for locating a vehicle (such as are described in U.S. Pat. No. 3,848,254 and 3,680,121) utilize a method in which the vehicle transmits a steady tone which is received by at least three spaced ratio receiving stations. In the system described in U.S. Pat. No. 3,848,254, the signal received at each station is retransmitted to a central site where the difference in time of arrival of the signal at each station is determined by phase comparison. These systems thus require generation of a fixed frequency signal and phase shift comparison of received signals at a signal for determining the location of the transmitting vehicle.

In another system, described in U.S. Pat. No. 3,419,865, a calibrated timing source is used for generating pulses at predetermined intervals. Each vehicle using this system is equipped with a pulse transmitter and a clock synchronized to a common clock system to actuate the vehicle transmitter during a unique time slot assigned to that vehicle. Multiple receivers each determine the time difference between the time of arrival of a signal from a vehicle and the time of generation of the clock pulse which initiated the vehicle signal. The time differences from each receiver are transmitted to a central site where a computer determines the location of the vehicle by solving simultaneous hyperbolic relationships. This system thus requires synchronization of each vehicle transmitter to a system clock and production of a pulse signal at preassigned time intervals.

SUMMARY OF THE INVENTION

Among the several objects of the present invention is the provision of a relatively simple system and method for locating a number of vehicles or carriers in a defined area without using a predetermined tone or time slot and in which the vehicle transmitting equipment requires little or no modification.

A principal object of the present invention is to provide a system and method for locating each of a plurality of signal transmitters without use of special tones or timed signal generation.

It is another object of the present invention to provide a system and method for processing received signals at each of a plurality of receiving sites and transmitting time of arrival data over standard telephone lines to a central site.

It is yet another object of the present invention to provide a method and system for locating a plurality of vehicles in a real time operational environment.

It is a further object of the present invention to provide a method and system for determining the location of a signal transmitter using any waveform transmitted over a voice frequency bandpass channel.

These as well as other objects and advantageous features of the present invention will be in part apparent and in part pointed out hereinafter.

In general, the present invention includes both a system and a method for locating a source of a randomly modulated radio signal. In one form of the invention, at least three receiving stations at known locations receive and process the randomly modulated radio signal. A common reference level is selected for the radio signal at each of the receiving stations. The times of arrival at each receiving station of selected transitions of the radio signal with reference to the common reference level are determined. Each receiving station provides an indication of the times of arrival of the selected transitions to a central facility for processing to provide an indication of the location of the signal source.

In one form of the invention, a microprocessor based radio receiving system determines the time of occurrence of specific events in a voice modulated signal from a remote transmitter whose location is to be identified. The microprocessor based system includes a radio receiver with a timing synchronization unit, an audio processing unit, a timing subsystem, a data storage unit, and a modem unit to transfer data to a central processing facility. The central processing facility determines the arrival time differences of the same signal at each of a plurality of receiving stations and uses the difference data to locate the transmitter.

In order to accomplish a highly accurate position determination, the locating system employs a plurality of geographically separated remote receiver stations. Each station includes apparatus for receiving a common time marker signal, such as, for example, a vertical retrace synchronization signal from a local television station, for establishing a common time base. For example, the receiver microprocessor timing subsystem may include a clock or counter which is periodically reset upon receipt of vertical retrace synchronization pulses transmitted by the local television station.

In the illustrative embodiments, a UHF receiver receives voice modulated signals, performs a demodulation and feeds the demodulated signal to an audio processing unit. The transitions of the voice modulated signal through a predetermined reference level are detected by the audio processing unit. Each transition generates a clock sample which is stored for later transmission.

The clock samples represent the time of arrival of the reference level transitions of an arbitrary received signal. A number of the transitions are accumulated and transmitted to the central processing facility for correlation, corrections and location calculations. This approach is totally compatible with an original tone, a digital sequence, a voice, or virtually any other waveform transmitted through a voice frequency bandpass channel.

The central processing facility in the present invention may be located at one of the receiver sites or at any other location desired. The central processing facility comprises a microcomputer, a receiving communication modem, a memory, associated hardware and operating software. The data from each receiver site is received through phone lines by modems. The modems output to a microcomputer card, where the data is stored into memory for processing. With four receiver sites, the method for detecting the location of a vehicle is reduced to a solution of a set of linear equations. Once a solution is computed, it is combined with time of day and if applicable a caller identification and frequency information and stored in memory for later retrieval. The data is retrieved from memory and sorted and transmitted to an applicable user or transmitted only on demand to the user via a communication link.

If desired, the locating system may include transmitter identification by associating a predetermined tone burst identification code uniquely with each transmitter. The microprocessor based radio receiving system receives the tone burst and decodes the identification code. The identification code and the corresponding transitions detected for the vehicle are sent to the central processing facility. Each vehicle is identified from the code and its location computed from the transitions.

In order to achieve the high accuracy, the system is periodically calibrated. System calibration is accomplished by periodically transmitting a modulated signal (with a unique calibrate identity code) from a known location. The transition times of arrival derived therefrom are then transmitted to the central analyzer facility for time-difference processing. The resulting time differences are then compared to known values and the error magnitude for each station-pair is recorded. These error magnitudes are then used to compensate corresponding station-pair time differences resulting from other unknown-location transmissions.

BRIEF DESCRIPTION OF THE DRAWINGS

FIG. 2 is an overall diagram of one of the individual receiving station unit shown in FIG. 1;

FIG. 9 shows the receiver interface processor unit data processor sequence;

FIGS. 10A-B illustrate an example of the time shifting operation of the central processing facility to determine the location of a vehicle as represented by the waveforms of FIG. 3.

DESCRIPTION OF A PREFERRED EMBODIMENT

A. General Description of the System Components

With reference to the drawings in general, there is illustrated a system and method in one form of the invention for determining the origin of a radio signal transmission without using special tones or codes. Transmitter identification may be accomplished by use of special codes, such as a tone modulated signal. The system includes a plurality of receiving stations 10, 20, 30 and 40 for receiving signals from a transmitter 62 which may be at an unknown location. Each receiving station is capable of detecting a radio signal transmission, demodulating the detected signal to obtain an amplitude varying signal and thereafter detecting transition of the received signal through a predetermined or common threshold and time coding or tagging each transition. The times of occurrences, with respect to a common time reference, of each of a string of transitions are transmitted to a central processing facility 50 from each receiving station. At the facility 50, a computer aligns the strings of transitions to identify a common signal segment and then determines the time shift necessary to effect alignment. The time shift represents the difference in time of arrival at the receiving sites thus providing data for computing the location of the transmitter.

Figure 1:
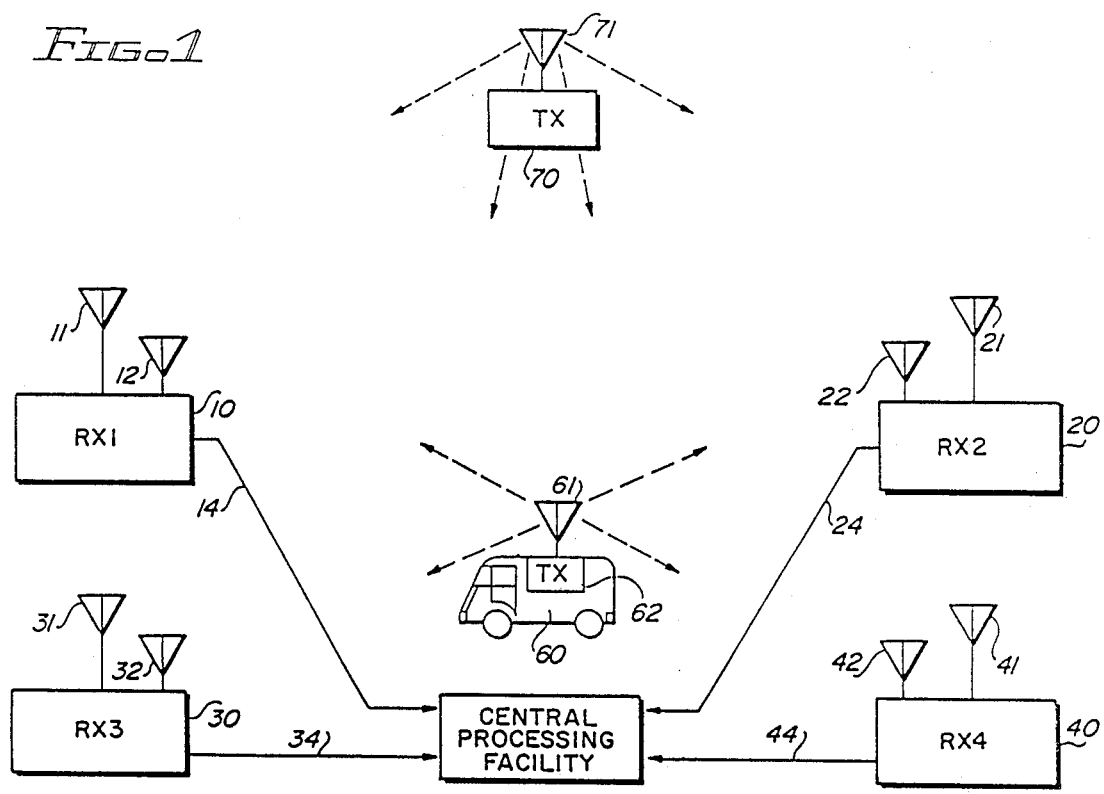
FIG. 1 is a basic diagram of the overall position locating systems.

More particularly, and with specific reference to FIG. 1, there is shown a basic diagram of one form of the position locating system. Distributed geographically about a region of interest is a plurality of remote receiving stations 10, 20, 30 and 40, each of which includes a respective antenna 11, 21, 31 and 41 for receiving a time marker or timing synchronization signal from a timing signal source 70. Respective receiving antennas 12, 22, 32, and 42 are also provided for receiving signals from a transmitter 62. A minimum of three remote receiving stations is necessary and a fourth is recommended to ensure ambiguity resolution and to provide a redundant measurement. The timing signal source 70 may comprise a local television station and the time marker signals may be the vertical synchronizing signals transmitted by such stations.

Each receiving station is coupled by respective communication links 14, 24, 34, and 44 to a central processing facility 50, which may be remotely located relative to the receiving stations. In FIG. 1, a vehicle 60 with transmitter 62 and a transmitting antenna 61 indicates a transmitter that is mobile with respect to the receiving stations 10, 20, 30 and 40. When the transmitter 62 initiates a signal transmission, the signal may be received at the stations 10, 20, 30 and 40. For purposes of this description, it is assumed that the transmission is of a voice modulated signal and that the modulation is within a voice frequency bandpass channel. The signal may be demodulated to identify such waveforms as an original tone, a digital sequence, voice, or any other waveform capable of being transmitted through a voice frequency bandpass channel. The modulated signal received at the station 10, 20, 30 and 40, is demodulated and the transitions of the amplitude varying demodulated waveform through a predetermined level are detected. In one form of the invention, the transitions of the demodulated waveform through a zero value are detected, hereinafter referred to as the zero crossing transition of the demodulated waveform. However, it will be appreciated that other reference levels could be utilized and the use of zero crossing transitions is not to be considered as limited thereto. Each receiving station 10, 20, 30, 40 records the time that each zero crossing transition of the demodulated signal occurs relative to a standard timing cycle, e.g., the vertical retrace cycle of the television signals, as indicated by a vertical synchronization (sync) signal.

The time of occurrence with respect to the vertical sync signals of each transition is digitized and recorded in a memory at each receiving station as a data word. The data words are stacked in the memory in chronological order. When an appropriate number of data words are obtained, the data are transmitted from the receiving station to the central processing facility 50. The data may be transmitted through an existing communication network such as phone lines. At the central processing facility 50, the sequence of data words from each receiver are compared with sequences of data words from each of the other receivers for approximately the same time period. Since the data words define a unique sequence of signals corresponding to the time occurrences of zero crossing transitions of the demodulated signal, the processor at facility 50 can identify a common signal sequence by matching and aligning the sequences of transitions identified by the data bytes. For any common sequence of transitions, the amount of time shifting necessary to effect alignment of sequences from any two receiving stations represents the difference in time of arrival of the transmitted signal at the two stations. Given this difference in time of arrival for at least three receiving stations, the location of the transmitter can be mathematically determined.

The time signal synchronization method using television signals provides accuracy, reliability, and availability in a metropolitan area. It should be noted, however, that other sources of timing signals for synchronization may be employed provided their precision is at least approximately 200 nanoseconds relative to each other. For example, signals transmitted by a microwave link, satellite link, or highly accurate clocks at each receiver may be used to provide the time base.

Since the present invention does not base its determination of the location of a transmitter on a special signal for locating purposes, as do many prior art systems, no modification of the transmitter is required. If desired, circuitry may be incorporated in the transmitter for initiating an identification code with each transmission. For example, such a code may be a tone signal generated by an FSK (frequency shift key) modulator to provide an eight bit tone modulated signal in a manner well known in the art. The FSK modulator, hereafter referred to as an ID generator, provides a unique eight bit code for each transmitter so equipped. Each receiver, in such a system, also includes circuitry for detecting the identification code and for correlating the data byte sequences with the detected code.

B. Remote Radio Receiver Station

Referring now to FIG. 2, there is shown a diagram of the general configuration of each individual receiving station. Each receiving station is comprised principally of five components: a time synchronization subsystem 100, an audio processing subsystem 102, a timing and data storage subsystem 104, a transmit/receive interface unit 106, and a plurality of receiver units 107, only one of which is shown. All the units are powered by power supplies 96 and 98 in a manner well known in the art.

The time synchronization subsystem 100 includes basic television signal processing components including a television tuner 101, a timing synchronization extractor unit 105 and a television antenna 103 for receiving television signals from a television transmitting station. The received television signal is coupled from antenna 103 to tuner 101. The signal may either be in phase alternation format (PAL) or the National Television Standards Committee format (NTSC). The signal selected by tuner 101 is coupled to the timing synchronization extractor unit 105 which extracts the vertical synchronization pulses and supplies those pulses to the microprocessor timing subsystem 104. Tuner 101 and vertical sync extractor 105 are well known in the television art.

The radio receiver unit 107 includes a receiver 110 and a matching antenna 108. The signal from the transmitter 62 is received by antenna 108 and fed to receiver 110. The receiver demodulates the audio signal (or other coded signal) from the transmitter signal carrier and routes it directly to the audio processing card 102, bypassing all the audio circuits in the receiver. The receiver 110 may be a UHF receiver, well known in the art, such as a model MCX-100 UHF receiver manufactured by Motorola Corporation. It includes a squelch line 113 which is monitored by the microprocessor timing subsystem 104 for purposes to be explained below.

The audio processing unit 102 includes the hardware logic necessary to monitor and select one of a plurality of demodulated signals from multiple receiver units, such as receiver unit 107, filter the selected signal, identify any ID code and detect the zero crossing transitions of the signal. If the signal includes an ID code, the audio processing unit 102 detects the code, decodes and passes it to the microprocessor timing subsystem unit 104 for subsequent transmission to the central processing facility 50. Additionally, the audio processing unit 102 detects the zero crossing transitions of the received signal and transfers this information to the microprocessor timing subsystem unit 104.

At each zero crossing transition, the microprocessor timing subsystem 104 samples a timer synchronized by the timing synchronization unit 105 to the television vertical sync signals. The timer sample represents the time of occurrence of a zero crossing transition with respect to a preceding vertical sync signal. The timer value for each zero crossing transition is stored in memory as a data word. A plurality of sequential data words are accumulated and then batch transmitted to the central processing facility 50 via the transmit and receive interface unit 106. Other time marker data is transmitted with the timer samples as will be explained hereinafter.

The transmit/receive interface unit 106 transmits a data block including the time of transition data words to the central processing facility over link 112. The data block includes ID information, if available, generated by the ID generator at transmitter 62. In addition, a self test mode (described later) initiated by the central processing facility or by switches at the receiver site generates calibrate timing words and ID codes which are also transmitted to the central processing facility through the transmit/receive interface unit 106 and link 112.

A remote receiving station transmits data to the central processing facility 50 under three conditions. The first condition is when a zero crossing transition detection is made by the audio processing card 102 and the microprocessor timing subsystem 104 transmits time samples to the transmit/receive unit 106. The second condition is a self test mode in which self test zero crossing time samples are transmitted to the central processing facilities as test data to determine the operational condition of the remote receiving station. The third condition occurs when a self test failure is detected and a status message is sent to the central processing facility.

Figure 4:
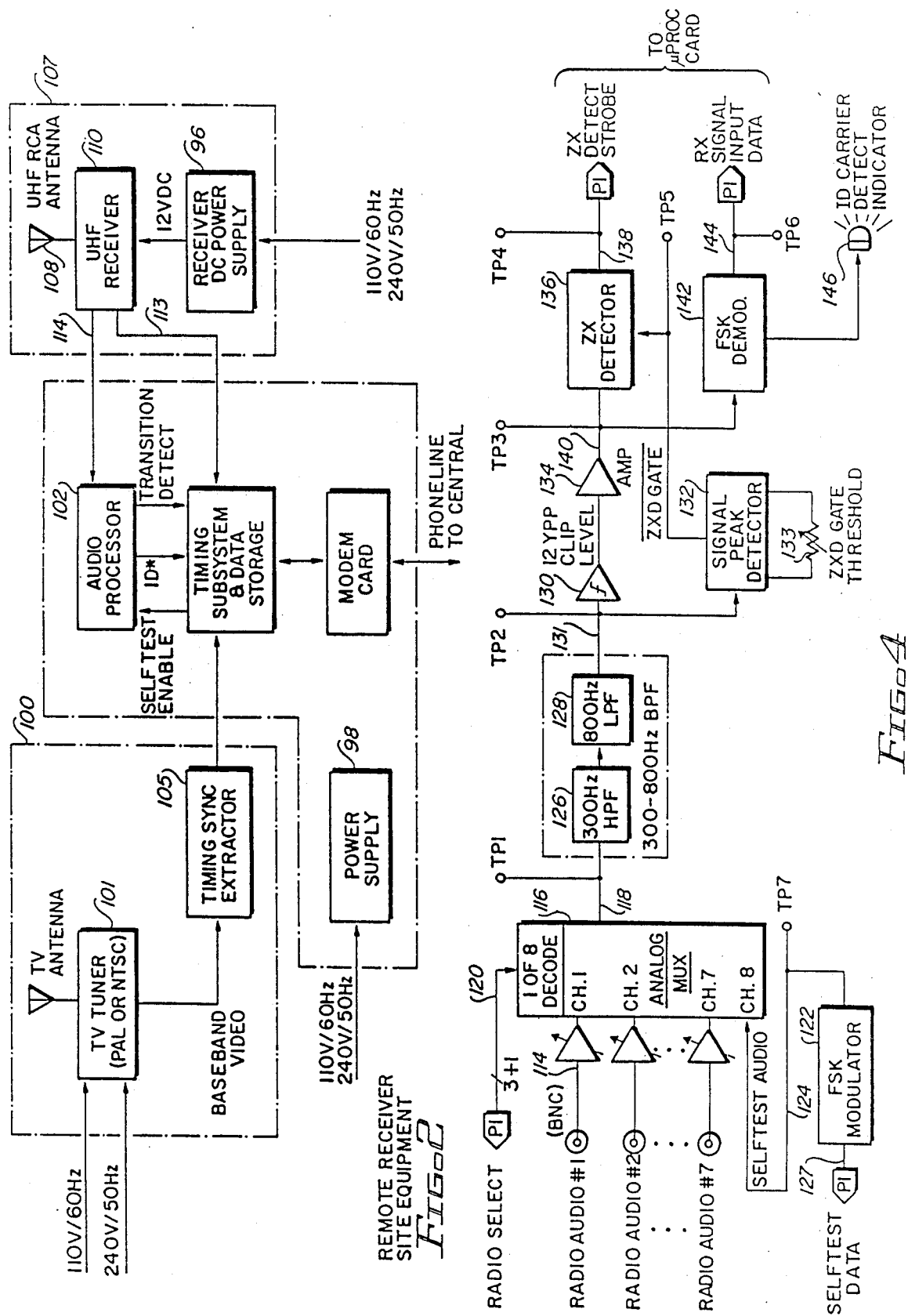
FIG. 4 is a simplified block diagram of the remote receiver station.
Figure 5:
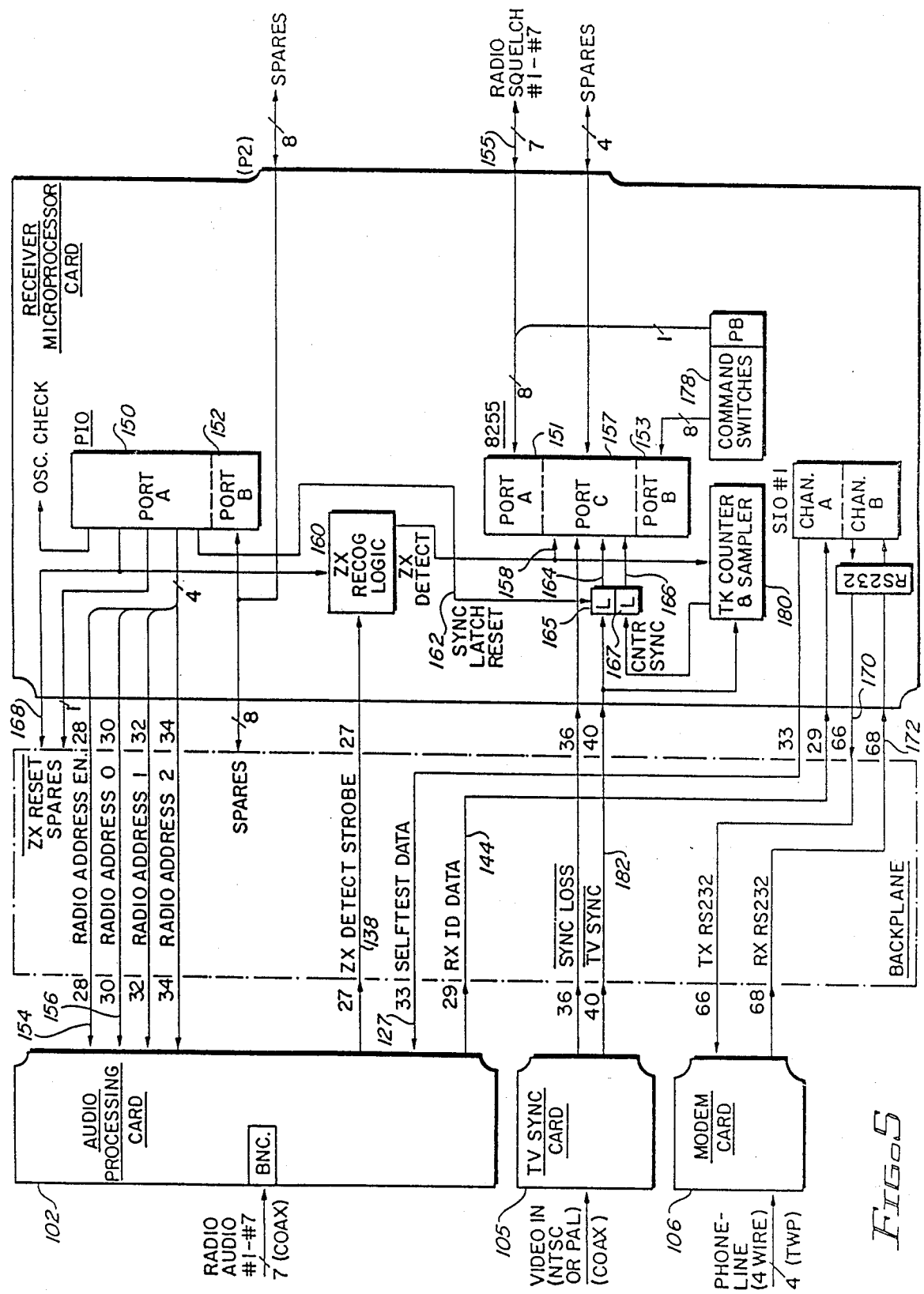
FIG. 5 is a detailed module interconnect diagram of the audio processing unit.
Figure 6:
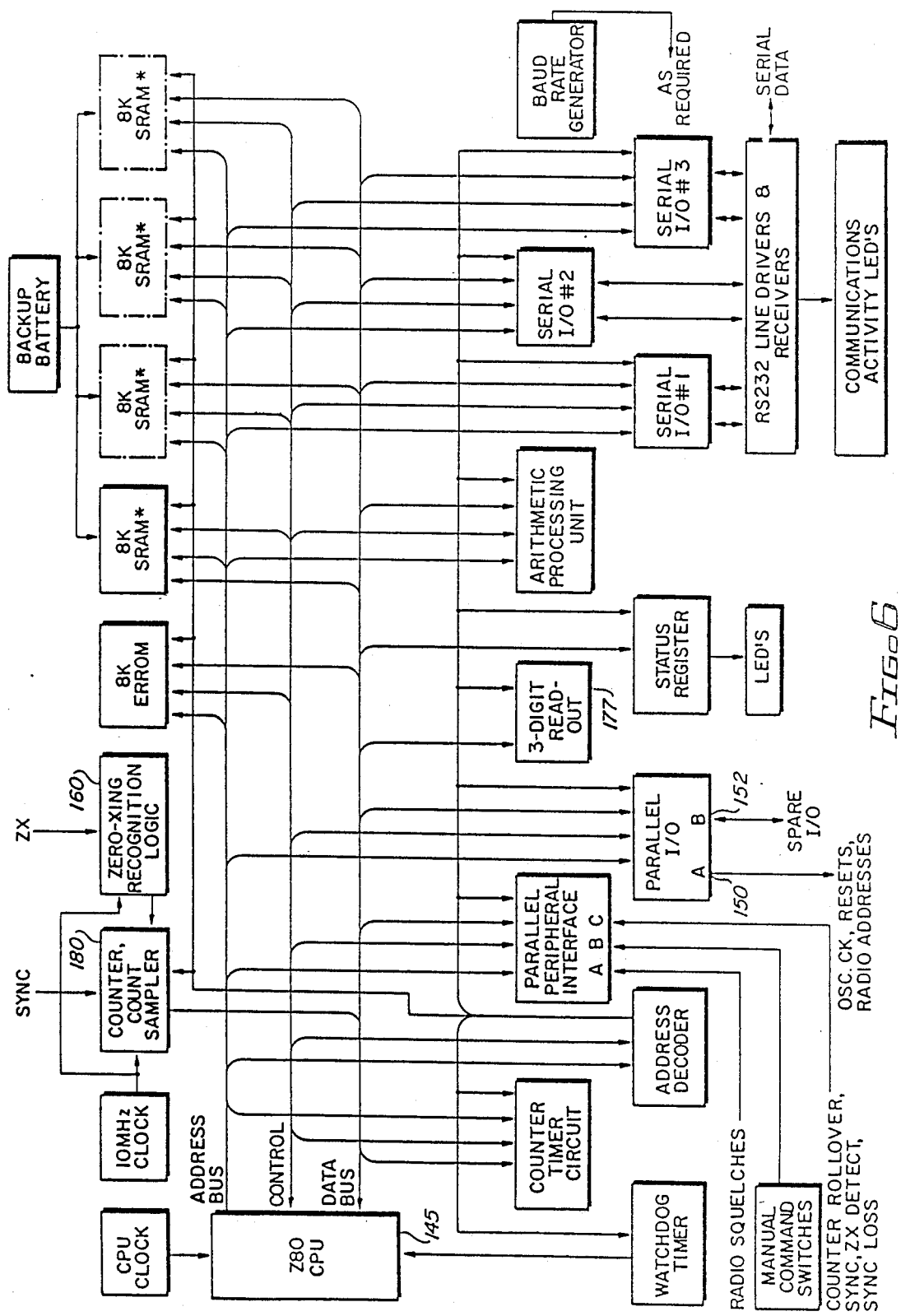
FIG. 6 is a block diagram of the receiver microprocessor timing unit of the remove receiver.

For a better understanding of the configuration and functional cooperation of the components shown in FIG. 2, described briefly above, attention is directed to FIGS. 4 through 6 of the drawings wherein the respective components shown in FIG. 2 are illustrated in detail.

C. Sample Waveform

Figure 3:
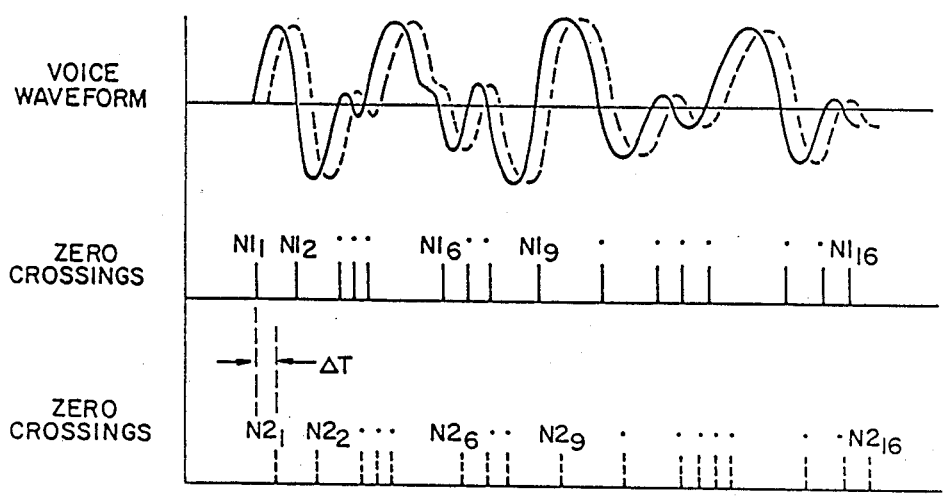
FIG. 3 illustrates the voice waveform for time delay measurements.

To best understand the position locating method, reference is now made to FIG. 3, where there is shown the waveform of a typical voice modulated signal received at two remote receiving stations 20 and 32, respectively. The zero crossing transitions for the waveform received at stations 20, 30 are shown on time axis $t_1$, $t_2$, respectively. The zero crossing transitions are indicated at $N1_x$, $N2_x$, respectively. The voice waveform is shifted in time because of the location of the transmitter relative to stations 20, 30. In this example, the transmitter is closer to remote receiving station 20 than remote receiving station 30. The difference in time between the corresponding zero crossing transitions of the voice waveform at the two stations is shown as T. The microprocessor timing subsystem 104 for each remote receiving station determines the time of each zero crossing transition and sends this information as a sequence of data words to the central processing facility 50. The central processing facility then determines an average $\Delta T$, i.e., the average time difference between the zero crossing transitions of the voice waveform as received at remote receiving station 20 and as received at remote receiving station 30. The average time differences computed between each pair of receivers is then used to compute the location of the transmitter 62 in a manner well known in the art.

D. Audio Processing Unit

Referring now to FIG. 4, there is shown a more detailed schematic of the audio processor unit 102. In general, a plurality of audio inputs from the multiple receiver units are fed to an analog multiplexer 116. In particular, the audio input from UHF receiver 107 is received by analog multiplexer 116 via one of the data paths 114. The analog multiplexer 116 has a plurality of input channels and an output channel 118. The multiplexer 116 selects one input channel depending upon a selection signal on control line 120. The control line 120 originates at the microprocessor timing subsystem unit 104. One of the input channels is preferably connected to a self test audio line 124.

In the self test mode, the microprocessor timing subsystem 104 generates a sequence of serial bits on line 127 which is passed to the frequency shift key modulator (FSK) 122. The FSK modulator 122 modulates the eight bit sequence into a tone and couples the modulated signal along line 124 to an input channel of the analog multiplexer 116. This allows the microprocessor timing subsystem 104 to self test the logic components of the audio processing unit 102 by initiating self test data through the FSK modulator 122.

The output signals from the analog multiplexer 116 are coupled via line 118 to a band-pass filter comprised of a high-pass filter 126 and a low-pass filter 128. The cutoff frequencies for the low-pass filter 126 and high-pass filter 128 are predetermined depending upon the characteristics of the expected incoming signal. In one form of the invention, high-pass filter 126 has a 300 Hz threshold frequency and the low-pass filter 128 has a 800 HZ cut-off frequency. The filtered signal is coupled via line 131 to a high gain limiting amplifier 130 and to a signal peak detector 132 with a variable threshold adjustment 133. The amplifier 130 expands the transition zone in order to improve resolution while limiting the peak signal amplitude. The signal peak detector 132 generates a threshold crossing detection gate signal on line 137 when there is sufficient signal to enable the zero crossing detector 136. The signal from limiting amplifier 130 is coupled through linear amplifier 134 and line 140 to the zero crossing detector 136 and the FSK demodulator 142. If the zero crossing detect gate signal on line 137 has enabled the zero crossing detector 136 and the signal from amplifier 134 passes through zero positively or negatively (in the positive direction or the negative direction), the zero crossing detector 136 generates a 1 microsecond strobe pulse on line 138. Thus, the circuit detects zero crossings of any waveform present on line 140 if the received signal is sufficient to trigger the signal peak detector 132. The zero crossing detect output strobe pulse is coupled to the microprocessor timing subsystem 104 via line 138. As will be apparent to those skilled in the art, detecting the transitions of the demodulated waveform through any other selected reference level can be easily accomplished by subtracting the reference level from the signal prior to coupling the signal to the zero crossing detector 136.

The signal on line 140 is also coupled to an FSK demodulator 142. The FSK demodulator 142 detects a tone burst (an ID code) if such a code is present on the demodulated signal. The demodulator converts the code into a sequence of bits that are output to the microprocessor timing subsystem 104 through line 144. In addition, the FSK demodulator energizes an ID carrier detect indicator 146 upon detecting an ID code on line 140. The output 144 from FSK demodulator 142 is fed to the microprocessor timing subsystem 104 for processing, recording and transmission to the central processing facility 50.

Briefly then, the audio processing unit 102 detects the zero crossing transitions of an input signal either from the UHF receiver, which receives the transmitted signal, or a self test audio signal generated from the microprocessor timing subsystem 104, and generates a zero crossing detect strobe pulse which is used by the microprocessor timing subsystem unit to sample the synchronized time counter.

E. Signal Interconnects Between Units

In general, FIG. 5 shows a module interconnect diagram between the audio processing unit 102, the timing synchronization subsystem 100, receive/transmit unit 106 and the microprocessor timing subsystem unit 104. The microprocessor subsystem timing unit 104 is shown in more detail in FIG. 6 and essentially comprises a microprocessor based microcomputer. A microprocessor 145, such as an Intel Corporation type Z80, is provided with two sets of parallel input/output ports 150 and 152 and three sets of parallel peripheral input/output ports 151, 153, and 157 through parallel peripheral interface 156.

A clock signal is derived from a CPU clock 147, as is well known in the art, for controlling microprocessor 145 internal operations as well as its interfacing with other elements of the microprocessor subsystem unit 104. The microprocessor 145 is coupled by address bus 149, control bus 145, and data bus 143 to random access memories 182, 184, 186 and 190, and to read only memory 192. The read only memory 192 is adapted to store in the instructions which microprocessor 145 executes to detect and recognize the time of arrival signals, to process these signals, including compaction, and to appropriately store the processed signals in designated areas of the random access memories.

Referring again to FIG. 5, the port 150 controls the radio address enable lines 154 and radio address line 156 to the analog multiplexer 116 on the audio processing unit 102. Additionally, port 150 controls the signal on a zero crossing reset line 168 and a sync latch reset line 162. Line 162 is connected to two latches, a first latch 165 for the TV sync pulse and a second latch 167 for a timing counter 180, whose operation will be described later. Port 151 responds to signals on radio squelch lines 157. Port 152 is connected to spare input/output lines. Port 153 responds to activation of manual switches 178 and port 157 responds to TV sync loss, counter rollover, zero crossing detect, and TV sync signals. The microprocessor operates under software control to poll all inputs and react to those inputs by controlling outputs.

For example, the microprocessor constantly polls the radio squelch lines 155 through port 151. When the radio receiver receives data above a predetermined threshold as set by the squelch control, the squelch line is raised to signal to the microprocessor that a transmission is being received by one of the receivers 107. The microprocessor determines which receiver 107 is active and outputs via port 150 the corresponding radio address on radio address lines 156 and activates the enable line 154 for the analog multiplexer 116 to select the active radio channel. At the same time, the microprocessor resets zero crossing recognition logic 160 via line 168 and enables the zero crossing detect strobe 138 from the audio processing unit 102 to be detected by port 157. After enabling the radio channel and the recognition logic 160, the microprocessor waits for a zero crossing detection strobe on line 138. The zero crossing recognition logic 160 sets a zero crossing detection signal on line 158 when a strobe pulse is detected on line 138. Upon detection of a strobe pulse, the microprocessor samples the timer, i.e., timing counter 180, and saves the counter value as a data word. Sync pulses generated by the timing synchronization unit 105 and fed to the TV sync latch 165 and the timing counter 180 maintain synchronization of counters 180 in each receiver. The counter 180 is driven or incremented by a high frequency clock oscillator 181 (See FIG. 6).

The zero crossing transition detection and time sampling process continues until either a predetermined number of samples are accumulated in memory, e.g., 100 samples, or a predetermined time has expired, e.g., one second. Once a time sample stack accumulation has begun, transmission to the central processing facility through the transmit/receive unit may begin while data stack accumulation continues. The transmission to the central processing facility is via the serial input/output port 170 to the transmit/receive unit 106 through port 107 and port 172 of the microprocessor.

An incoming radio signal containing an ID code will be detected as including either continuous or periodic bursts of FSK tones in the voice band. The FSK tone sequence is demodulated by the audio processing unit 102 and a serial data word is sent to the microcomputer via the RX/ID data line 144. The microcomputer inserts ID bits at the beginning of each time sample data stack and displays the ID code of the transmitter via a three digit ID alpha numeric display 177. FSK ID tones are processed in the same manner as any other waveform. The only difference is that the detected zero crossing transitions will be more regular and numerous. Data stacks of zero crossing time samples are processed to the central processing facility 50 identically to voice signals.

1. Self Test

A self test mode is available in the microcomputer and is activated either by the command switches 178, or by central commands via the transmit/receive unit 106 from the central processing facility 50.

To actuate the self test mode, the microcomputer outputs a signal on the radio address lines 156 which switches the analog multiplexer 116 to couple the FSK tone to line 118. A predetermined code is sent serially via serial input/output port 191 and line 127 to FSK modulator 122. The microcomputer then verifies that the detected ID code corresponds to the predetermined code. If the codes do not correspond, an error message notifies processing facility 50 of a malfunction.

If the detected ID code data corresponds to the transmitted self test data, and as long as self test is activated, there will be a constant stream of zero crossing detect strobe pulses. The microcomputer assembles the time data stack in the normal way, complete with the self test ID code, and transmits these stacks regularly to the central processing facility through port 192. The central processing facility examines these stacks to verify that the receiver is performing normally. Other self test features are manually implemented by command switches 178 on the microprocessor subsystem timing unit 104. The switches 178 enable simulation of commands that are normally received via the transmit/receive unit 106. They may also be used to trigger diagnostic subroutines contained in the microprocessor software and to trigger certain preprogrammed transmissions to the central processing facility via the transmit/receive unit 106.

F. Microcomputer

Referring now to FIG. 6, there is shown a detailed schematic diagram of the microprocessor based timing subsystem and data storage unit 104, more appropriately described as a microcomputer. The form and manner of interfacing the various elements to microprocessor 145 in order to create a microcomputer are known in the art and not described herein. However, an understanding of the operation of binary counter 180 and the zero crossing recognition logic 160 are important to an understanding of the present invention.

Figure 7:
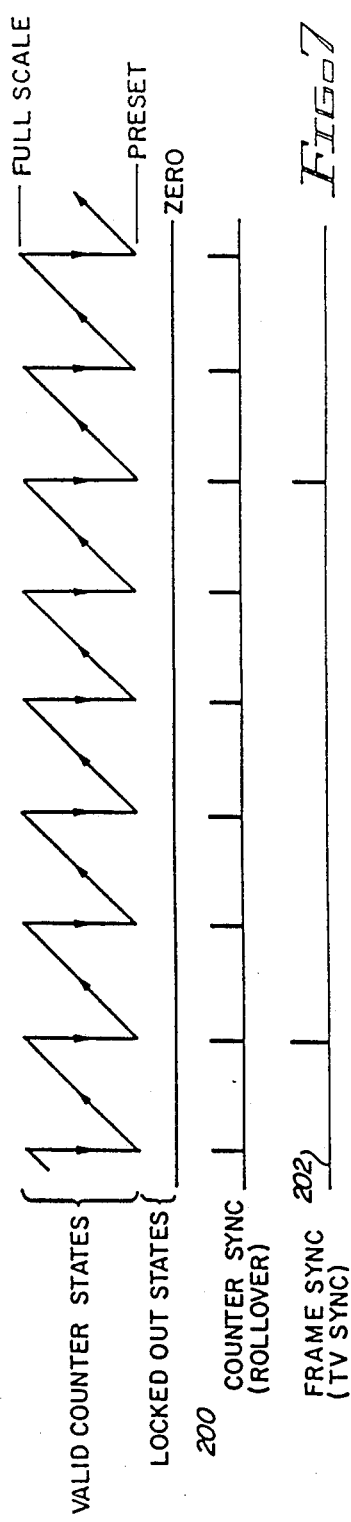
FIG. 7 shows a time keeping counter operation used for explaining the operation of the remote receiver unit.

Referring now to FIG. 7, there is shown the microcomputer time keeping counter operations. Timers in each remote receiving station comprise binary counters which count up to a predetermined count and rollover. Rollover (or reset) is shown as a sequence of pulses on the counter sync axis 200 (counter sync pulses). The frame sync axis 202 corresponds to pulses from the timing sync extractor unit 105 (frame sync pulses). The binary counter 180 has insufficient capacity to count between frame sync pulses developed by the timing sync extractor unit 105. The counter 180 is adjusted so that the rollovers occur an exact integer number of times for each frame sync interval. For example, the counter 180 rolls over five times for each frame sync cycle. Although the frame sync interval is different between NTSC and PAL, the counter 180 is adjusted for integer values of the rollover within the frame sync cycle. One method of adjustment is to set a minimum count value, i.e., the counter 180 reset is to a value other than zero. The preset level of FIG. 7 is indicative of this non-zero state.

The timing counter 180 is resynchronized (preset) every time a frame sync pulse is received. Resynchronization eliminates any drift or phase difference accumulation caused by the asychronous clock oscillator driving the timing counter 180. In general, accumulated drift between frame sync pulses in normally less than 100 nanoseconds.

Each time a zero crossing transition of a detected or received waveform occurs, the counter 180 is sampled and the count value stored in memory. When counter reset (rollover) occurs, a counter sync pulse is generated and a binary code indicative of counter rollover is placed in sequence with the count values in memory. Similarly, the frame sync pulse results in a binary code being placed in the memory stack. When either a predetermined number of entries have accumulated in the memory stack or a predetermined time has elapsed, the stack contents are batch transmitted to the central processing facility. Since both counter rollover events and frame sync events are included with the counter values, the time occurrence of zero crossing transitions are available from the stored memory values.

G. Central Processing Facility

1. Central Processing Hardware

Figure 8:
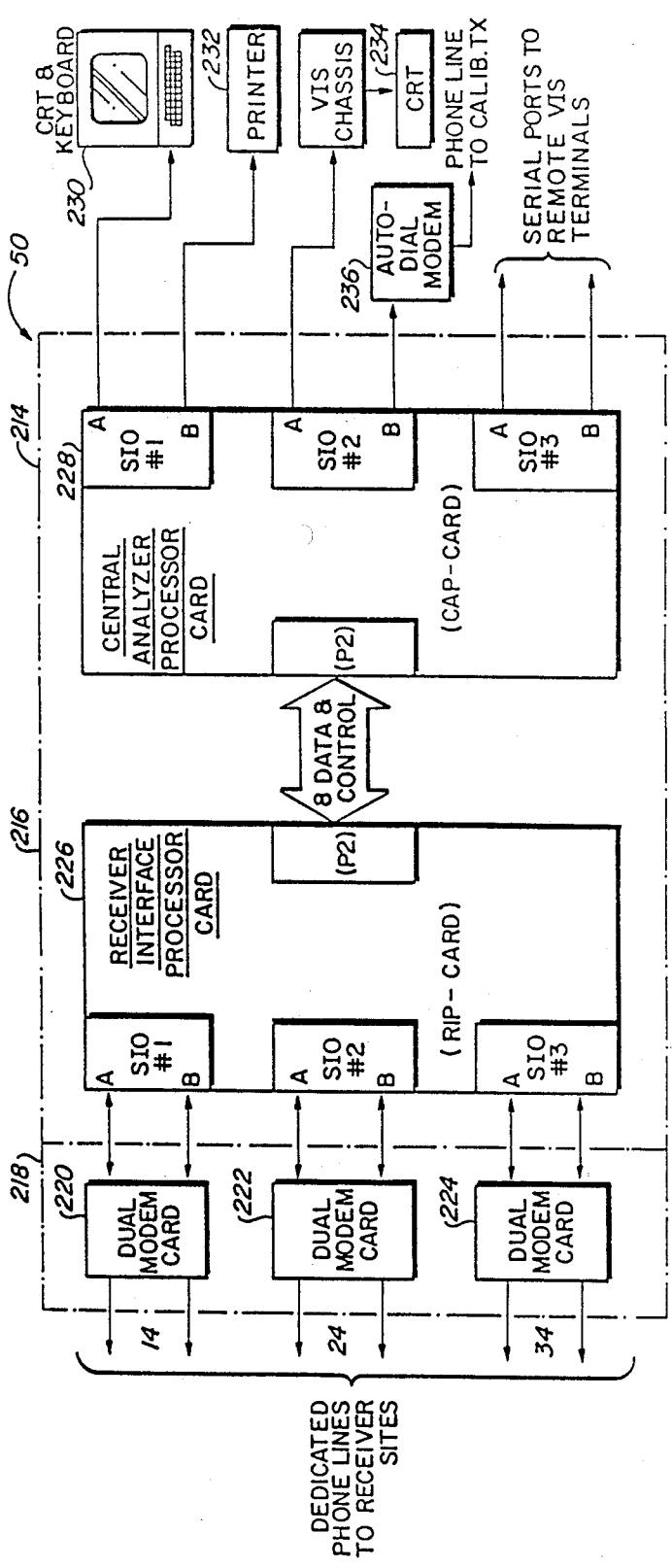
FIG. 8 shows a block diagram of the Central Processing Facility.

Referring to FIG. 8, there is shown a block diagram of the central processing facility 50. The central processing facility 50 comprises a communication section 218, a receiver interface processor section 216, and a central analyzer processor section 214. The central processing facility communicates with the remote receiving stations for receiving data consisting of time word samples, responding to data transmitted by the remote receiving stations, and transmitting instructions to the remote receiving stations. The central processing facility 50 analyzes time word samples from the remote receiving stations and outputs analyzed data to an appropriate display form such as a CRT 230 or printer 232.

Communications to the remote receiving stations are via the communication section 218 which includes a plurality of dual modem units 220, 222 and 224.

Data from each modem unit is applied to an input of the receiver interface processor unit 226. The receiver interface processor unit 226 receives time, status and response data transmitted by the remote receiving stations. Additionally, it transmits instructions from the central analyzer processor unit 228 to the remote receiving stations. The receiver interface processing unit 226 reduces the time word samples from each remote receiving station to a single, average time difference number ($\Delta T$) for each remote receiving station pair which is transmitted to the central analyzer processor unit 228. The receiver interface processor unit 226 controls the bidirectional communication between the central analyzer processor unit 228 and the remote receiving stations.

The central analyzer processor unit 228 receives the remote receiving station pair time differences and computes the location of the transmitter from the data. The data may be further processed for display in a viewer understandable form.

2. Receiver Interface Processor Unit

The receiver interface processor unit 226 receives time word data, receiver status data, and receiver response data from the remote receiving stations. The receiver interface processor unit 226 transmits central analyzer processor commands to the remote receiving stations.

3. Receiver Interface Processor

The major task of the central receiver interface processor unit software is to accept data blocks from the remote receivers and then process the data to extract the averaged time difference estimates. A functional block diagram outlining the major tasks is illustrated in FIG. 9 with the receipt of incoming data, block 300.

The receiver time counters in the illustrative embodiment are synchronized by a common external synchronization reference such as a TV vertical retrace or frame sync signal. Since each remote receiving station is located a different distance from the synchronizing TV station, the time counters will be offset by a differential signal propagation delay to each site. This offset must be removed by correcting the incoming time bytes by a number equivalent to the differential propagation delay relative to a reference-site. To facilitate the correlation process it is desirable to remove the offset value from all incoming time words, block 302, before storing in buffer memory, block 304. A further correction is necessary to compensate for radio receiver internal propagation delay differences. This number is derived as a result of an automatic calibration cycle, transmitting from a known location in a manner well known in the art. All three data compensation constants are combined into a composite single correction constant for each receiving site.

System calibration is accomplished by periodically transmitting a modulated signal (with a unique calibrate identity code) from a known location. The zero-crossing times of arrival derived therefrom are then transmitted to the central analyzer facility for time-difference processing. The resulting time differences are then compared to known values and the error magnitude for each station-pair is recorded. These error magnitudes are then used to compensate corresponding station-pair time differences resulting from other unknown-location transmissions.

The compensated time data words are stacked in buffer memory since it may be necessary to do repetitive scanning as part of the correlation process. The correlation process, block 306, is the process of matching up corresponding zero crossings from all reporting receivers, calculating the time differences, block 308, and determining the mean value. The standard deviation of all time differences used to calculate a mean is also calculated, block 310. The time differences, means, and standard deviations are transmitted to the central analyzer processor unit for further analysis, block 312.

Referring now to FIGS. 10A–B there are shown the data blocks from remote receiving station 20 and remote receiving station 30 as they arrive at the central processing facility for the example shown in FIG. 3. The remote receiving station microcomputer system does not save the first zero crossing of the transmitted waveform that it detects but instead the first zero crossing is used to start data processing. In FIGS. 10A–B, the waveform of FIG. 3 is shown as time samples that arrive at the central processing facility. FIG. 10A is a time frame for the data blocks as they arrive at the central processing facility from remote receiving stations 20 and 30. Time increases in the downward direction. Thus in FIG. 10A, the data corresponding to the voice waveform of FIG. 3 detected by receiver 30 (R×30) has reached the central processing facility before the voice waveform data has been received by the central processing facility time remote receiving station 20 (R×20). This difference in data arrival time at central is illustrative of different communication line delays and is not related to signal time-of-arrival differences at the receiver sites. The counter sample CS that occurs in the first byte in the data stack signifies that the counter 180 has rolled over and generated a counter sync (CS) rollover pulse. The counter sample signifies the first counter sync rollover after the first zero crossing of the received voice wave form from the vehicle. The next data block $N1_1$ corresponds to the second zero crossing of voice wave form as shown in FIG. 3 as received at remote receiving station 20. Continuing, $N1_2$ is the time word for the third zero crossing, $N1_3$ is the time word for the fourth zero crossing, etc. A frame sync pulse is signified by the FS data block in the data stack of remote receiving station 20.

The central receiver interface processor unit aligns the time marks (CS and FS) and data words in each cell to determine the time difference ($\Delta N$). FIG. 10B shows an example of determining the time difference between the zero-crossings (N1) of the voice waveform received at remote receiving station 20 and the zero-crossings (N2) of the voice waveform received at remote receiving station 30. The first column represents the data stack received from remote receiving station 20 aligned by use of the CS and FS markers with corresponding data in the second column representing the data stack received from remote receiving station 30.

After the frame sync (FS) and the counter syncs (CS) are aligned, the processor unit determines the time difference in the zero crossings of the same waveform as received by remote receiving station 20 and remote receiving station 30. The processor unit scans the zero crossing time data words and determines which zero crossing time data words correlate with each other and are less than the maximum possible difference in time for a signal to travel between remote receiving station 20 and remote receiving station 30 (the base line difference). Once the processor unit identifies a difference that is less than a base line difference, the actual time difference $\Delta N12$ between the two received waveforms transitions is computed. The column labeled R×20-R×30 represents the results of the time difference computation for those differences less than the base line difference.

The receiver processor unit computes the $\Delta N12$ values for all corresponding time data words and then averages these time differences by summation and division to determine a mean value $\Delta T$ and standard deviation for the time difference in the received wave form at each receiver. The mean value $\Delta T$ is expressed as $\Sigma N12/k$ where k is the number of correlated zero-crossings, i.e., one for each $\Delta N12$ value. Any zero crossing transitions which do not correlate with any other zero crossing transitions from another receiver are disregarded. This procedure is carried out for each pair of receiving stations resulting in time of arrival data (in time difference values) for the signal from the transmitter 62 at each receiving station. The time differences are then used for locating the transmitter by application of standard mathematical procedures.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

We claim:

1. A method for determining the origin of a radio signal transmission, the radio transmission being received by at least three spaced radio signal receiving stations, each station having a radio transmission receiver and a synchronizable timer, said method comprising the steps of:
   (1) at each of the stations
      (a) detecting a signal transmission;
      (b) demodulating the detected transmission for obtaining an amplitude varying signal;
      (c) detecting the transitions of the amplitude varying signal through a predetermined reference value;
      (d) synchronizing the timer to a common time base;
      (e) determining the times of occurrence of each of a sequential plurality of transitions of the amplitude varying signal through the predetermined reference level; and
      (f) transmitting the times of occurrences to a central processing facility;
   (2) at the central processing facility
      (g) comparing the pattern of the sequential times of occurrences detected at one of the stations to those detected at another of the stations for identifying common signal transmissions;
      (h) aligning the common signal transmissions;
      (i) determining a time shift necessary for effecting the steps of aligning; and
      (j) computing the origin of the transmission from the determined time shift.

2. The method of claim 1, wherein the predetermined reference value is a zero level and step (c) of detecting comprises the step of detecting the zero crossing transition times of the amplitude varying signal.

3. The method of claim 2, wherein the steps (g) of measuring and (f) of transmitting further comprise the steps of:
   sampling the timer at each detected zero crossing transition;
   storing a predetermined number of timer samples in memory;
   transmitting the predetermined number of time samples as a set to the central processing facility.

4. The method of claim 3 wherein the step (d) of synchronizing comprises the steps of:
   receiving a repetitive time marker signal; and
   resetting the timer at each time marker signal.

5. The method of claim 4, and including the step of storing an indicator of receipt of each time marker signal in time sequence with the timer samples.

6. The method of claim 5 wherein step (h) of aligning comprises the steps of:

locating each of the time marker signals in a sequence of timer samples; and aligning the time marker signals from one station with those from another.

7. The method of claim 5 wherein the steps (i) of determining comprises the steps of:

computing the time difference between corresponding zero crossing transitions in the aligned sequences; and averaging the time differences for establishing the time shift.

8. The method of claim 5, wherein each timer comprises a timing counter responsive to the time marker signal for being reset to a selected count, the counter having a predetermined maximum time cycle less than the time between consecutive time marker signals and being automatically reset to the selected count at the end of each cycle, the counter generating a rollover signal at each reset, the method further comprising the steps of:

synchronizing the timing counter with the time marker signals such that a timing counter rollover occurs an integer number of times between two successive time marker signals; and storing each rollover signal in sequence with the timer samples for providing an indication of the occurrence of the timing counter rollover in relation to the zero crossing transition times and the time marker signals.

9. The method of claim 8, and including the step of transmitting a set of zero crossing transition times samples after each of a predetermined time interval.

10. The method of claim 1 further comprising the step of detecting a tone burst identification code to uniquely identify each transmitter.

11. The method of claim 1 further comprising the steps of:

(aa) periodically transmitting from a known location a predetermined modulated signal having a predetermined identity code;

(bb) performing the steps (a)-(j) for obtaining a computed origin of the predetermined signal transmission;

(cc) comparing the computed origin of the predetermined signal to the known origin;

(dd) determining an error correction for aligning the computed origin to the known origin for effecting a system calibration; and (ee) compensating succeeding computing origins with the error correction.

12. A system for determining the origin of a randomly modulated radio signal transmission, the system including at least three spaced radio receiving stations, each station having a radio signal receiver and a synchronizable timer, the system comprising;

means at each station for receiving and demodulating said received signal transmission and for detecting zero crossing transitions of the demodulated signal;

means for sampling the timer at each of the detected zero crossing transitions for obtaining a time of occurrence of each transition;

means for storing a set of zero crossing transition times of occurrences;

means for comparing the sets of transition times from each of the stations for identifying a common signal sequence; and means for determining the time difference between the transition times at each of the stations of the common signal sequence for establishing a difference in time of arrival of the common signal sequence at each station for enabling computation of the origin of the transmission with respect to the stations.

13. The system of claim 12, wherein each radio receiver includes means for identifying a coded modulated signal in the signal transmission for identifying a source of the transmission.

14. The system of claim 12 and including:

means for receiving a time synchronization signal; and means responsive to the time synchronization signal for setting the timer.

15. The system of claim 14 wherein the timer comprises a counter incremented by a high frequency clock signal, the counter counting to a predetermined count and thereupon resetting to an adjustable minimum count, and including means for resetting the counter to the minimum count upon receipt of each time synchronization signal.

16. A method of identifying a common signal received by two or more receivers at spaced locations comprising the steps of:

converting the signal received at each receiver to an amplitude varying signal;

identifying each transition of each amplitude varying signal through a predetermined reference amplitude level;

determining the time of occurrences of each transition with respect to a reference time mark common to each receiver;

forming a time sequence of the times of occurrences of the transitions at each receiver;

aligning the time sequences from different ones of the receivers using the reference time mark;

comparing the sequences to identify corresponding transitions based upon the pattern established by time differences between consecutive ones of the transitions; and identifying common signals based upon coincidence of the time differences between consecutive transitions.

17. The method of claim 16 and including identifying an origin of the common signal by the steps of:

measuring the time difference between corresponding transitions in the time sequences from different ones of the receivers; and computing the signal origin from the time difference in signal reception based upon the time difference between corresponding transitions.

18. A method for detecting the location of a source of a randomly modulated emission, said method comprising the steps of;

providing at least three receiving stations at known locations, each station receiving and converting said randomly modulated emission into an electrical signal which varies randomly in a manner corresponding to the modulation of said emission;

selecting a common reference level for said randomly varying electronic signal at each of said receiving stations;

detecting transitions of said randomly varying electrical signal through said common reference level;

transmitting to a central processing facility indication signals for each station representative of the time of occurrence of each transition, which thus represents the time of arrival of a corresponding segment of said randomly modulated emission to the respective receiving station;

identifying at said central processing facility the indication signals which represent the same transition;

determining the time differences between said indication signals for the same transition; and thereafter computing the location of the randomly modulated emission from said indication signal time differences.

19. The method recited in claim 18 further comprising the steps of:

synchronizing each receiving station to a common time reference signal;

inserting the time reference into a sequence of said time of arrival indication signals; and thereafter aligning a sequence of said time of arrival indication signals by correspondence between the time reference signals.

20. The method recited in claim 18 wherein said same transition identifying step comprises the step of recognizing essentially equal time differences between the times of occurence for several transitions.

21. The method recited in claim 18 further comprising the steps of:

storing a predetermined number of said indication signals at each receiving station; and thereafter transmitting the predetermined number of said indication signals to said central processing facility for carrying out said identifying, determining and computing steps.

22. The method recited in claim 18 wherein said computing step comprises the steps of:

computing the time differences for a plurality of selected transitions;

determining an average for the time differences; and thereafter computing the location of the randomly modulated emission from the averaged time differences.

23. A method for identifying at a central facility the location of a randomly modulated emission received by three receivers at spaced locations, comprising the steps of:

at each receiver converting the received randomly modulated emission into an amplitude varying electrical signal;

generating a reference time mark common to all receivers;

determining the times of occurrence of each transition of the amplitude varying signal through a predetermined reference amplitude level with respect to the reference time mark;

transmitting a sequence of the times of occurrence to the central processing facility;

at the central processing facility receiving the time occurrence sequence from the receivers;

analyzing and identifying the pattern established by time differences between consecutive transitions; and thereafter computing the location of the randomly modulated emission using the time difference between the time of occurrence between common transitions.

* * * * *